Patented June 29, 1954

2,682,466

UNITED STATES PATENT OFFICE 2,682,466

HIGH PROTEIN FOOD PRODUCT AND
PROCESS FOR ITS PREPARATION

Robert A. Boyer, Cincinnati, Ohio

No Drawing. Application May 6, 1952,
Serial No. 286,447

25 Claims. (Cl. 99—14)

This invention relates to a food product, and is a continuation-in-part of my copending application, Serial No. 118,445, filed September 28, 1949. In particular it relates to synthetic meat and to methods of producing synthetically foodstuffs which will have the flavor, coloring, taste and "chewiness" of meat. By the term meat I mean to include not only the meat of mammals, but also the meat of fish, fowl, shell fish and crustaceans.

It is well known that proteins are essential to the human diet and that proteins in the form of meat are the most attractive of all protein foods to the average human taste. It is unfortunate however that meats are one of the most expensive classes of foods there are, and it has therefore long been the goal of food scientists to develop a low cost but satisfactory substitute for meat. Some progress has been made in this direction. Various meat flavors have been produced synthetically and are available commercially. As an example, may be cited bouillon cubes having chicken, beef and other meat flavors. Furthermore, various food dyes have been perfected so that it is possible synthetically to reproduce the coloring of various meats. It has also been demonstrated that some vegetable proteins, although much lower in cost, have nutritive values approximately equal to many meat proteins. The stumbling block up to this point has been in the reproduction of the texture and appearance of natural meat, the texture of course involving the factor of "chewiness." Vegetable chops using wheat gluten as a base have a certain amount of "chewiness," but they do not duplicate the fibrous character of meat; and they fail to give that satisfaction that comes from the breakdown in the mouth during the mastication of a piece of meat.

With the above considerations in mind, it is an object of my invention to produce synthetically a proteinaceous food product.

It is another object of my invention to produce synthetically from vegetable protein or animal protein or combinations thereof, a product which closely resembles natural meat as to its appearance, as to its fibrous qualities, as to its flavor, as to its nutritive value, and as to its chewiness.

It is another object of my invention to produce synthetical meat as above outlined which will closely simulate the white meat of chicken or turkey, which will simulate a filet mignon or a pork chop or other specific types and cuts of meat available in butcher shops.

It is another object of my invention to provide a process for the production of synthetic meats which process is relatively simple and which can be carried out on a continuous basis.

It is still another object of my invention to provide a process for the production of synthetic meat as above outlined which can be carried out very cheaply, so that the synthetic meat produced according to my invention will be very inexpensive on the market.

Artificial textile fibers have been made synthetically from vegetable protein such as soy beans, corn or peanut protein, as well as from animal proteins such as casein and keratin. Generally speaking, such fibers are made by preparing a quantity of filaments of such protein material, coagulating them in a coagulating bath and then stretching them by means of a series of rolls revolving at increasing speeds. Such filaments are then usually placed in a salt solution (such as sodium chloride) of sufficient concentration to prevent the filaments from re-dissolving. About one-half per cent is sufficient for some proteins although higher salt concentrations may be necessary. These filaments in the production of textile fibers are then insolubilized by treatment in a formaldehyde bath.

The filaments according to the prior art are generally produced by dispersing the proteins which are the starting material in a suitable dispersing medium such as an alkaline aqueous solution. Actually, depending upon the material dispersed, and the dispersing agent used, the dispersion may amount to a collodial solution, and it will be understood that the use of either term in the claims is inclusive of the other. This dispersion is then forced through a porous membrane such as a spinneret used in the production of rayon, and passes into a coagulating bath which is generally an acid salt solution. The streamlets coming through the spinneret are thus precipitated into the form of filaments. Alternatively, coarser filaments can be produced by starting with the proteins in the form of powdered material and plasticizing them with about 25 per cent of alkaline water and then extruding the plasticized protein material through dies. The filaments produced by this process may be of much greater thickness than those produced by a spinneret. These coarser filaments may be of a thickness on the order of paint brush bristles and even though they are stretched afterwards, as outlined above, the final filament will be relatively coarse. On the other hand the filaments as they emerge from a spinneret, which actually is a small die having from perhaps five thousand to fifteen thousand holes each on the order of .003 inch in diameter, will be of a diameter of about .003 inch. When these filaments are stretched, as outlined above, they are elongated and reduced in diameter until the average thickness of such a filament may be on the order of 20 microns.

Regardless of the initial procedure in producing the filaments, the filaments will normally be approximately the color of the starting protein. If a coloring agent is added to the protein dispersion, the resulting filaments will retain the approximate color of the dye. As will be pointed out hereinafter, the die extrusion process may be used where it is desired to simulate a coarse grained meat, whereas the spinneret extrusion procedure may be used where it is desired to simulate a relatively fine textured meat.

Thus, one spinneret will produce several thousand filaments which are very fine (about 20 microns in diameter). These several thousands filaments will constitute a group of filaments or a bundle of filaments which group or bundle may have a diameter of perhaps one-quarter inch. If a battery of spinnerets or dies as above outlined are provided, there will be a considerable number of bundles or groups of filaments which, when assembled together, may constitute what I have hereinafter called a "tow" of filaments, which tow, depending upon the number of dies or spinnerets used, may be conveniently three to four inches in diameter.

The formation of filaments in groups and tows for textile purposes is well known, and it constitutes a series of preliminary steps which, together with the procedures to be disclosed hereinafter, complete the process of forming the synthetic meat products. In my procedure I borrow the technique as it is known today except that I do not carry out the insolubilizing treatment of the filaments.

I have mentioned, above, the fact that the formed filaments are placed in a salt solution to prevent them from re-dissolving.

The pH of this salt solution may be adjusted to any desired level and it will be obvious that the fibers upon immersion in it will soon attain the same pH as the solution. Since most meats have a pH range of 5.6 to 6.4, I frequently adjust the pH of the fibers to these levels. However, I have obtained satisfactory results over a wide pH range and therefore do not wish to limit myself in regard to the pH of the fibers or the finished product.

A palatable food product may thus be produced without the use of binders or fats as hereinafter outlined; but in order to take full advantage of the capabilities of my invention in simulating natural meat, it is desirable to proceed as will now be explained.

In order to convert the filaments which have been produced as above set forth into a meat product they should be freed from excess salt solution as for example by squeezing or centrifuging. By this I do not mean that they must be dried but that they should not be dripping wet. The groups of filaments thus treated should then be treated with edible binders.

I define the term binder in connection with the present invention, as an agent or medium for holding the filaments in place, in relation to each other. The binder, according to my invention, may exercise its function, by way of example but without limitation, by holding the filaments together adhesively, by retaining them as in a matrix, or by physically tying them together. Thus the binder may be constituted of a casing such as an edible sausage casing, in which case the casing is filled with the filaments by procedures which are well known; or again the binder may be constituted of edible fibers, filaments or sheets, by means of which the filaments are physically tied together. On the other hand the binder may be an edible material such as one of the starches, cereals, dextrins, proteins, gums, alginates, or carboxy methyl cellulose, which perform their binding function either adhesively or by serving as a matrix in which the filaments are embedded. It will be clear that the binder may consist of individual materials, as outlined above, or of combinations of such materials.

These edible binders may be applied continuously in dust form by a suitable dusting apparatus or the groups of filaments may be passed through a bath containing the binder in liquid form. After treatment with the edible binder, the filaments may be passed through a bath of melted fat or treated with fat in solid form, as by extending a ribbon of fat into the tow. Finally the groups of filaments are assembled by pressing together to form a tow, and are cut into suitable lengths convenient for handling and sale. The pressure in assembling can be light or heavy depending upon the density and texture desired in the final product. For example, a finished piece might be constituted by a length of tow say eight or ten inches long and having a diameter of three or four inches. This final piece of synthetic meat can then be sliced longitudinally or at a slight angle to the direction of the fibers or across the grain, depending upon the kind of meat which is being simulated, and can be baked, broiled or cooked in any desired manner.

In order to simulate the various types of meats, there are a number of variables which can be modified but the fundamental procedures remain the same. I have pointed out above how filaments come from the spinneret in groups. Differences in effect can be produced by the number of groups which are assembled together after treatment with the binder and before passing through the fat bath. Individual groups may be individually passed through the fat bath or two or more groups may be assembled together and passed through the fat bath as a unit. Another variable is the type of fat through which the groups are passed, and yet another variable is in the thickness of fat coating applied. Other variables of course are the flavoring material which may be added along with the fat and the coloring material which may also be added with the fat. The flavoring material may be any of the commercially available materials and may include protein hydrolysates. The flavoring and coloring material could be added at other stages in the process. The texture of the meat can be varied by the procedure outlined above where, instead of passing the pulpy mass of vegetable protein through a spinneret, the protein material, after having been plasticized, is extruded through dies. The latter procedure produces coarser filaments and can be used in the simulation of coarse grained meat.

By way of example, in simulating a pork chop or the like, instead of assembling the groups of filaments as they come out of a battery of spinnerets, these groups would be kept separate with a separate group coming from each spinneret, the groups being normally about one-quarter inch in diameter. Each of these groups would then be passed individually through lard or shortening or other melted fats and given about a one-sixteenth inch coating of fat. After the fat coating, the coated groups would be assembled together to give the final tow having a diameter of three to four inches. Before the final assembly the groups may be passed through the binder, and flavoring, coloring, vitamins and the like can be added as desired.

In simulating a filet mignon, the procedure would be similar to that for a pork chop except that the groups of filaments coming from the spinneret would first be assembled into approximately four groups before the fat coating procedure. In other words, individual groups would not be fat coated but plural groups containing three or four spinneret groups would be treated simultaneously with the fat coating. The assembly thereafter would be the same as disclosed above.

In simulating the white meat of chicken or turkey, all the filament groups would be assembled together after being treated with the binder and before being passed to the fat bath.

It has been shown in the prior art of producing man-made textile fibers that physical properties such as strength and elasticity are greatly influenced by the degree of molecular orientation, and similarly I have found that the toughness or tenderness of the synthetic meat product is also affected by an orientation of the protein molecules.

A degree of orientation is brought about by an alignment of the protein molecules as the solution or dispersion passes through the extrusion orifice. It is intended in the present invention therefore that the term "oriented protein fibers" will include those fibers which have been produced by extrusion through an orifice, whether or not they have been subjected to stretching.

Further orientation of the molecules is obtained by stretching the freshly formed and relatively plastic filaments; and a stretching procedure involving no more than leading the fibers away from the extrusion orifice at a rate of speed sufficiently great to prevent the fibers from being formed in a kinky condition enhances the orientation, and consequently the strength.

For instance if the filaments emerging from the spinneret or die are not stretched at all, they will tend to be weak, tender, inelastic and kinky. Usually they will be as large or larger than the opening from which they emerged. On the other hand if the filaments are pulled away from the spinneret or die at a speed sufficiently great to keep them straight and prevent kinking, a further orientation of the molecules occurs and the filaments become stronger, attain elasticity, and usually will be smaller in diameter than the orifice from which they emerged.

The synthetic product made from the kinky or unstretched fibers will lack chewiness, whereas the product made from more highly oriented fibers will have improved chewiness and a more meat-like texture.

The extrusion rate of the fibers through the die or spinneret can be calculated, as is well known. If the take-away reel, or godet wheel as it is sometimes called, is driven at such a rate that its peripheral speed is exactly equal to the extrusion rate, we have zero stretching. If the godet wheel has a peripheral speed twice the extrusion rate, we produce 100% stretching.

It will be obvious that, as the speed at which the filaments are led away from the spinneret or die is increased, the stretching effect will be increased, resulting in a greater degree of orientation. There is an optimum amount of orientation for each type of protein fiber which results in maximum strength and elasticity. I have found however, that it is not necessary to use fibers having maximum strength and elasticity in preparing meat-like products, and in fact have obtained satisfactory results by employing fibers produced over a wide range of stretching tensions.

In practicing my invention, I may employ stretching tensions which are so great that they cause breakage of the filaments before they are completely converted from the solution phase to the solid phase, at which time the filaments are very weak. In these cases, I find it advantageous to apply the stretching forces to the filaments after they have been led out of the precipitating bath and in such a manner that the stretching tensions are not transmitted back to the filaments in the precipitating bath. In these cases, I usually lead the filaments away from the spinneret at a speed just sufficient to keep them in a straight condition, and then after leading them out of the precipitating bath I stretch them by any suitable means such as passing the fibers in the form of a continuous tow over rolls or series of rolls revolving at increasing speeds.

In this manner I can apply varying amounts of stretching tensions in a practical and continuous manner. For instance I can increase the length of a one foot section of tow as it leaves the precipitating bath to two feet as it leaves the last stretching roll. This would be applying a stretch of 100%.

In practicing my invention with soy bean protein I have applied stretching tensions satisfactorily as high as 400%. Higher stretches with this material frequently cause excessive breakage of the filaments. In general, with soy bean protein I prefer to employ stretching tensions from about 50% to about 400%. Appropriate stretching tensions for other protein materials can readily be determined.

It will be understood that the stretching range set forth herein applies to total stretch produced, whether the stretch be produced in its entirety in the coagulating bath, or after emergence from the coagulating bath, or partly in the bath and partly after emergence from the bath.

Another method for controlling toughness is by the use of hardening, tanning, or insolubilizing chemicals. For instance, soaking the fiber in a brine of sodium chloride of any concentration up to a saturated solution will have a toughening effect. Brine has a similar effect on many meats. Other chemicals, such as aluminum sulphate, formaldehyde, and tannic acid will insolubilize the filaments although care must be taken to guard against toxic or other undesirable effects.

If it is desired to tenderize the filaments, proteolytic enzymes (e. g. papain, bromelin, pepsin, trypsin, etc.) may be used as in the known procedures for tenderizing meats. Partial hydrolysis for the same purpose may be effected by the use of such agents as hydrochloric acid, sodium sulphide, alkaline hydroxides, etc., as is well known in the field of protein chemistry.

I have outlined above by way of example how certain specific meats can be simulated. It will be clear that almost any kind of meats can be simulated simply by varying one or more of the variables mentioned above, that is, the grouping of the spinneret groups prior to the fat treatment, the type of fat used in the treatment, the thickness of the fat coating, the number and direction of the simulated tendon or connective tissue, the flavoring and coloring material and the toughness. If additional nutritive values are desired, they can be imparted to the final product by the addition of vitamin concentrates, dried milk solids, amino acids and the like. The flavor of a product can, of course, be enhanced if, for example, in simulating the white meat of chicken or turkey the fat bath be of chicken fat or turkey fat. For simulating pork it would be desirable to use pork fat and for beef, beef fat.

It should be noted that the end product, provided the procedures have been carried out under sterile conditions, will be absolutely sterile and wholly free from enzymes and bacteria. It may be found desirable for some purposes to add certain enzymes, but it must be noted that these will have been added intentionally. If the product is canned or vacuum packed under sterile conditions, the product will of course be absolutely sterile. This is not true of untreated natural meat which at all times contains bacteria and enzymes which contribute to its spoilage and decay.

It will be understood that the food product of the present invention may be shredded, ground or otherwise comminuted; and in comminuted form it may be stuffed into sausage casings, or put up in paste-like form in cans or other containers.

It will be understood that almost an infinite number of variations may be made in the process above disclosed without departing from the spirit of the invention. Regardless of the variants used for any particular type of meat which is to be simulated, the fundamental process will remain the same.

Having now fully described my invention, what I claim as new and desire to secure by Letters Patent, is:

1. The process of preparing synthetic meat which includes the steps of preparing a quantity of filaments of protein material, and applying to said filaments an edible binder chosen from the group consisting of cereal binders and edible protein binders.

2. The process of preparing synthetic meat which includes the steps of preparing a quantity of filaments of protein material, applying to said filaments an edible binder chosen from the group consisting of cereal binders and edible protein binders and applying fat to said filaments.

3. The process of preparing synthetic meat which includes the steps of preparing a quantity of filaments of protein material, stretching said filaments at least to a degree sufficient to produce an orientation of the molecules, applying to groups of said stretched filaments an edible binder chosen from the group consisting of cereal binders and edible protein binders, passing said filaments through a bath of melted fat, and assembling said filaments into a tow.

4. The process of preparing synthetic meat which includes the steps of dispersing a protein in a dispersing medium, forcing the dispersion obtained through a porous membrane into a coagulating bath to produce a quantity of fine filaments, stretching said filaments at least to a degree sufficient to produce an orientation of the molecules, applying to groups of said stretched filaments an edible binder chosen from the class consisting of cereal binders and edible protein binders, passing said filaments through a bath of melted fat, and assembling said filaments into a tow.

5. The process of preparing synthetic meat which includes the steps of plasticizing powdered protein material and extruding said plasticized material through dies into a coagulating bath to produce a quantity of filaments, stretching said filaments at least to a degree sufficient to produce an orientation of the molecules, applying to groups of said stretched filaments an edible binder chosen from the group consisting of cereal binders and edible protein binders, passing said filaments through a bath of melted fat, and assembling said filaments into a tow.

6. The process of preparing synthetic meat which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the group consisting of cereal binders and edible protein binders, passing said groups of filaments through a bath of melted fat, and assembling said groups of filaments into a tow.

7. The process of preparing synthetic meat which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the groups consisting of cereal binders and edible protein binders, passing said groups of filaments individually through a bath of melted fat, and assembling said groups of filaments into a tow.

8. The process of preparing synthetic meat which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the group consisting of cereal binders and edible protein binders, assembling a number of said groups of filaments and passing said assembled groups individually through a bath of melted fat, and further assembling said assembled groups of filaments into a tow.

9. The process of preparing synthetic meat which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the group consisting of cereal binders and edible protein binders, assembling said groups of filaments into a tow and passing said tow through a bath of melted fat.

10. The process of preparing simulated white meat of fowl which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the group consisting of ceral binders and edible protein binders, assembling said groups of filaments into a tow, and passing said tow through a bath of melted fat of the fowl whose meat is being simulated.

11. The process of preparing simulated pork which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the group consisting of cereal binders and edible protein binders, passing said groups of filaments individually through a bath of melted pork fat, and assembling said groups of filaments into a tow.

12. The process of preparing simulated beef steak which includes the steps of preparing a number of groups of filaments of soy bean protein material, stretching said filaments at least to a degree sufficient to produce an orientation of the molecules but not exceeding about 400 per cent, applying to said groups of filaments an edible binder chosen from the group consisting of cereal binders and edible protein binders, assembling a number of said groups of filaments and passing said assembled groups individually through a bath of melted beef fat, and further assembling said assembled groups of filaments into a tow.

13. A food product consisting of oriented man-made fibers of natural protein held together by means of an edible binder chosen from the group consisting of cereal binders and edible protein binders.

14. A food product consisting of oriented man-made fibers of natural protein held together by means of an edible binder chosen from the group consisting of cereal binders and edible protein binders with inclusions of fats.

15. A food product comprising oriented edible fibers, extruded from a mass of natural protein.

16. A meat-like product comprising oriented edible fibers, extruded from a mass of natural protein.

17. A food product comprising oriented man-made fibers of natural protein held together by means of an edible binder.

18. A food product comprising oriented man-made fibers of natural protein, with inclusions of fats.

19. A food product comprising oriented man-made fibers of natural protein held together by means of an edible binder, with inclusions of fats.

20. A food product comprising oriented edible fibers, extruded from a mass of natural protein, and an edible flavoring material.

21. The process of preparing a synthetic food product, which includes the steps of preparing edible filaments by mechanically extruding them from a mass of natural protein, and assembling said filaments into a food product.

22. The process of preparing a synthetic food product, which includes the steps of preparing edible filaments by mechanically extruding them from a mass of natural protein, assembling said filaments into a food product, and adding a flavoring material thereto.

23. In a process of preparing a synthetic food product from edible filaments mechanically extruded from a mass of natural protein, the step of assembling said filaments into groups.

24. In a process of preparing a synthetic food product from edible filaments mechanically extruded from a mass of natural protein, the step of adding an edible flavoring material to said filaments.

25. In a process of preparing synthetic food product from a mass of natural protein, the step of extruding said protein in the form of filaments.

References Cited in the file of this patent

UNITED STATES PATENTS

| Number | Name | Date |
| --- | --- | --- |
| 1,001,150 | Kellogg | Aug. 22, 1911 |
| 2,162,047 | Allen | June 13, 1939 |
| 2,211,961 | Meigs | Aug. 20, 1940 |
| 2,376,485 | Hermann et al. | May 22, 1945 |
| 2,398,636 | Henney et al. | Apr. 16, 1946 |

OTHER REFERENCES

"The Meat Flavour" by Max Salomen, Food Manufacture, March 1943, pages 91 and 92.